United States Patent [19]
Schwarz

[11] 3,991,839
[45] Nov. 16, 1976

[54] PROJECTION SCALE WITH PRICE INDICATOR

[75] Inventor: Josef Schwarz, Balingen, Wurttemberg, Germany

[73] Assignee: Bizerba-Werke Wilhelm Kraut KG, Germany

[22] Filed: Oct. 29, 1975

[21] Appl. No.: 626,710

[30] Foreign Application Priority Data
Oct. 31, 1974 Germany............................ 2451820

[52] U.S. Cl.................................. 177/40; 177/178; 353/41
[51] Int. Cl.² ........................................ G01G 23/34
[58] Field of Search .................... 177/25, 34, 36, 40, 177/44, 178, 177; 353/41, 40; 235/61 PS

[56] References Cited
UNITED STATES PATENTS
1,721,398  7/1929  Jacob.................................... 353/41

3,912,027  10/1975  Schwarz................................ 177/40
3,912,028  10/1975  Schwarz................................ 177/44

Primary Examiner—Joseph W. Hartary
Attorney, Agent, or Firm—Hauke & Patalidis

[57] ABSTRACT

A price-indicating projection weighing scale provided with a plurality of projectable graduation scales on a support member having several price scales each corresponding to a certain base price, the support member being movable in dependence of weight, and an optical projection system comprising an objective which is movable and indexable opposite a graduation scale in dependence of the pre-selected base price for projection of a section of the price graduation indicia on a focusing screen. The objective is affixed to a movable support which is movable and positionable via an adjustment unit, operated from the outside, which is set in accordance with a selected base price of the merchandise to be weighed.

15 Claims, 5 Drawing Figures

PROJECTION SCALE WITH PRICE INDICATOR

BACKGROUND OF THE INVENTION

Scales of the type which indicates the weight as well as the price of merchandise have a graduation support provided with a multitude of price graduations or indicia, either parallel above each other or arranged side by side, each corresponding to a certain base price of the merchandise, i.e., a certain price per weight unit. In order to project a particular section of the graduation scale, the projection system, i.e. the light source, the condenser and the objective, are movable relative to the graduation scale support. In this manner, a price group to be projected may be selected.

The shifting of the projection system in known types of scales is effected by a hand-operated or motor activated drive which is provided with indexing notches for the various price row positions. Cable driven pulleys are used, for example, in which a cable or belt winds or unwinds around a drum with indexing notches, and this controls the location of the projection system. It is also known to use notched and threaded revolving spindles in connection with an adjustment unit which is coordinated with the projection system. In all known systems the projection unit, that is objective and light source plus condenser, is moved directly by an externally mounted price adjustment mechanism.

In designing a price indicating projection scale an object is to provide the available graduation scale surface with as many price graduations as possible in order to achieve the most accurate detailing of the adjustable base price graduation. This requires high precision of the graduation scale as well as of the moving mechanism of the optical projection system. Presently known projection scales generally enlarge the price graduation scale about 40 times. If the projected graduation scale is to be placed on a focusing screen with a 1-millimeter accuracy, positioning of the optical projection system must be effected with an accuracy of 0.025 mm. Therefore, the adjustment drive must be produced with especially high accuracy and/or precision.

Even the most minute inaccuracies in the adjustment mechanism as well as in the setting mechanism have, therefore, an extremely disadvantageous effect. Thus, a not precisely centered cable roll or even just the influence of the cable thickness can result in an inaccuracy in the positioning of the objective. It is also possible that the price graduations on the graduation scale support are spaced in such a way that they do not precisely correspond with the notched positioning of the objective. Moreover, the spaces between the separate price graduation scales can be imprecise; for example, the distance between the first and last graduation scale increases evenly or unevenly. In such cases, adjustments are extremely difficult and many times impossible so that, in certain cases, large errors in price indication must be accepted.

SUMMARY OF THE INVENTION

It is the object of this invention to avoid and eliminate the disadvantages of projection scales presently on the market, and to provide a projection scale that allows for easy correction of tolerances and inaccuracies in the adjustment mechanism of the graduation scale support. This is accomplished by the present invention by providing a drive mechanism with adjustable transmission ratios inserted between the adjustment mechanism and the objective support. Preferably, the present invention contemplates mounting the objective on a swivel-joined lever, attached to the scale housing, said lever being provided with a guiding slot into which movably fits, in longitudinal direction of the slot, a carrier bolt or pin which is movable along an adjustable guide rail firmly attached to the housing such as to swivel the lever around its fixation point.

These and other objects of the invention will become apparent when the following description of the preferred mode of practicing the invention is read in conjunction with the drawing wherein:

DETAILED DESCRIPTION OF THE PREFERRED EMBODIMENTS

Figure 1:
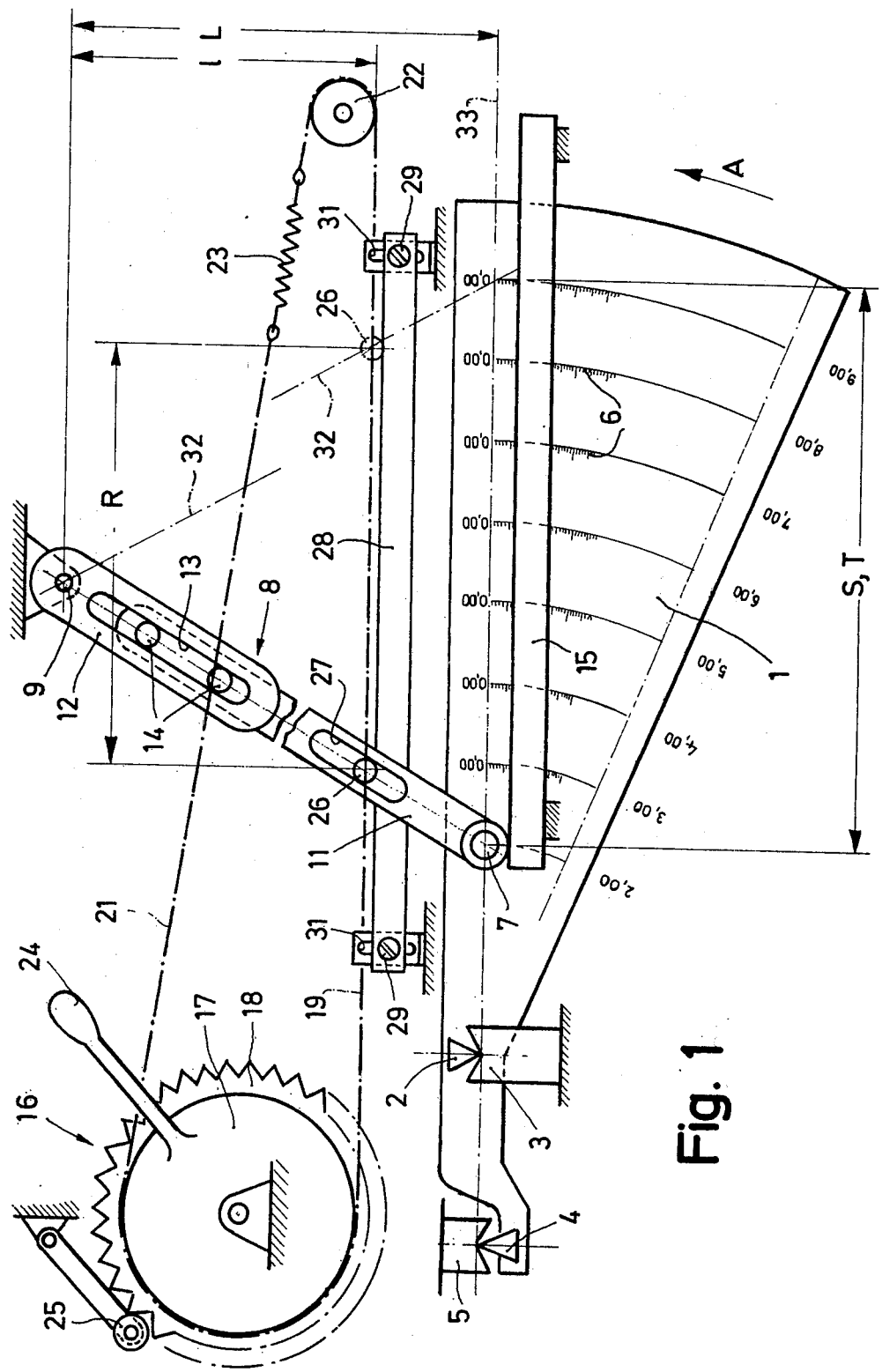
FIG. 1 is a schematic view of a graduation scale support and of an adjustment mechanism for an optical projection system according to the present invention.

FIG. 1 illustrates schematically a graduation scale support 1, mounted in a generally known fashion, swiveling relative to a stationary step-bearing 3 by means of a knife 2. The graduation scale support 1 is connected via another knife 4, with a movable part of the scale, for example, a swivel lever of which at FIG. 1 only one step-bearing 5, resting on the knife 4 is illustrated. Corresponding to the weight of the merchandise that is placed on the scale, the graduation scale support 1 is swung at a certain angle in the direction of the arrow A. The angularity of the graduation scale support 1 is, therefore, a measure for the weight of the goods to be weighed.

The graduation scale support 1 is made of a transparent material, preferably glass. It is provided with a number of parallel rows of price graduation scales 6 which are coordinated with a certain base price of merchandise, that is the price of the weight unit in question. FIG. 1 shows several base price graduation scales for price units 2.00 through 9.00 as an example.

The price graduation scales 6 are projected by an optical projection system, if necessary via deflection mirrors, onto an opaque or translucent panel (not shown in FIG. 1). The projection system consists of a light source disposed behind the graduation scale support, a condenser and an objective, of which only the objective 7 is shown schematically at FIG. 1. The objective 7 is mounted on the free end of a swivel lever 8 which pivots about a pivot point 9 on the housing of the scale. The lever 8 is made in two sections, a lower section 11 and an upper section 12. The lower section 11 which supports the objective 7 is telescopically movable relative to the upper section 12 which is joined to the pivot point 9. For this purpose, the upper section 12 is provided with a longitudinal slot 13 in which two guiding bolts or pins 14 mounted on the underside of the lower section 11, are led in gliding motion. The lower section 11 of the lever 8, in turn, is guided by a rail 15 in the housing so that the objective 7, upon swiveling of the lever 8 around the pivot point 9 scans precisely over the initial points of the price scales 6 of the graduation scale support 1, as long as the scale is empty.

Swiveling of the lever 8 and the ensuing positioning of the objective 7 on a certain price scale 6 is effected by an adjustment or control mechanism 16, schematically shown, simplified, at FIG. 1. The adjustment mechanism consists of a drum 17 provided with a notched disk 18, from which a pulley cable or belt 19 as well as a tensioning cable or belt 21 can be wound and/or unwound. The drive and the tensioning cable or belt consists of a length of cable or belt which is passed over a deflecter roll 22 and whose ends are connected by a tension spring 23. The drum 17 may be turned by hand by means of a lever 24 and is indexable in preferably even spaced steps by engaging a roller 25 with the notches on the periphery of the disk 18.

The drive cable or belt 19 is provided with a carrier bolt or pin 26 which engages a guide slot 17 in the lever 8, the guide slot 17 branching out from the pivot point 9 in a radial direction.

The carrier bolt 26, connected to the drive cable or belt 19, is guided during lateral shifting along a guide rail 28 in the housing. The rail 28 is attached to the housing by means of two screws 29 projecting in elongated holes 31 in the housing and thus can be moved or twisted in its position in relation to the housing. FIG. 1 shows the guide rail 28 and the guiding of carrier bolt 26 by way of the guide rail 28 in a schematic manner only. Any appropriate arrangement, for example consisting in fitting of the carrier bolt 26 into a longitudinal slot in the guide rail 28 or disposing the carrier bolt within the guide rail with the aid of guide rolls will be apparent to one skilled in the art, as well as an appropriate arrangement for guiding the lower section 11 of the lever 8 relative to the guide rail 15.

The guide rail 28 imposes an exactly definable trajectory on the carrier bolt 26 when the drum 17 is rotated. This trajectory can take various shapes; for example, the carrier bolt 26 can be forced to move along a straight line, however, a curved line, as will be explained hereinafter, is also possible. Throughout this prescribed trajectory, the carrier bolt 26 is displaced within guide slot 27 when the lever 8 is swiveled, i.e., the distance between the pivot point 9 and the carrier bolt 26 is changed. This results, upon equally spaced shifting of position of the carrier bolt 26 along the guide rail 28, in causing swiveling of the lever 8 about corresponding angles, depending on whether the distance of the carrier bolt 26 from the swivel point 9 is large or small.

In the example illustrated at FIG. 1 the guide rail 28 runs parallel to the guide rail 15 and therefore parallel to the zero line 33 of the unloaded graduation scale support 1. The pivot point 9 of the swivel lever 8 is coordinated, in relation to the graduation scale support 1, in such manner that the swivel motion of the lever 8 from the lowest price scale to the highest one scans approximately the area of an isosceles triangle. In FIG. 1, the lever 8 is shown as in one of its extreme positions (at the scale for the 2.00 price units), the other extreme position being illustrated by a dash-dot line 32.

Figure 2:
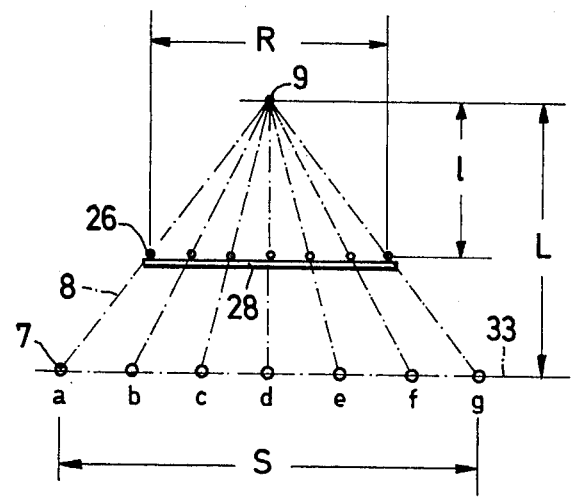
FIG. 2 is a schematic diagram of various adjustment positions of the objective at a certain position of the guide rail.

To further explain the functioning of the adjustment mechanism for the lever 8, FIG. 2 illustrates, schematically, the pivot point 9, the guide rail 28, the zero line 33 of the unloaded graduation scale support and the lever 8 with carrier bolt 26 in seven different positions a–g. The distance between guide rail 28 and pivot point 9 is marked 1 (as in FIG. 1), the distance between the zero line 33 and the pivot point 9 is marked L. If the carrier bolt 26 is moved by the adjustment mechanism 16 along the guide rail 28 over the distance R, the objective 7 is moved along the zero line 33 over the greater distance S. Since the guide rail 28 and zero line 33 are parallel the value S can be obtained from the value R by multiplication of the latter with the quotient L : 1. The distances S and R are divided in like proportion by the indexing points of the adjustment mechanism, i.e., the ratio of the trajectory carrier bolt 26 and the objective 7, and is determined by the notches of the notched disk 18 of the adjustment mechanism 16 of FIG. 1. The indexing stops are preferably arranged at uniform intervals, and the lever 8 is then swiveled around the same angle when moving from one indexing point to the next.

Figure 3:
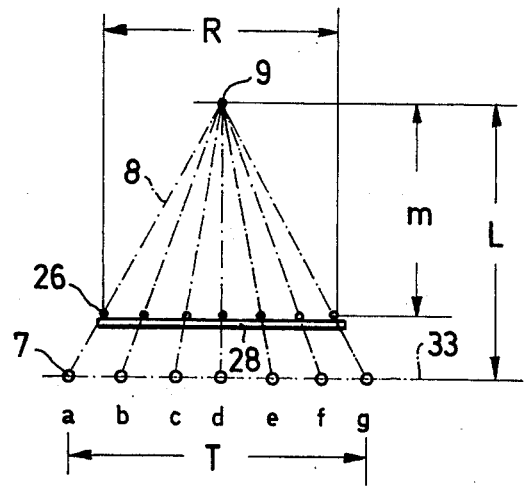
FIG. 3 is a view similar to FIG. 2 with a different position of the guide rail.

FIG. 3 is a schematic view similar to FIG. 2, differing from it only due to the fact that the guide rail 28 is farther removed from the pivot point 9 by the larger distance m. If the carrier bolt 26 is displaced for the same distance R, the objective 7 (In this embodiment) is only displaced over the shorter distance T which results from multiplying the distance R with the quotient L : m. A change of the distance between the guide rail 28 and the pivot point 9 by parallel shifting of the guide rail also leads to a change of the absolute trajectory of the displacement of the objective 7 along the zero line 33, wherely the distances are, as previously explained, divided by the same ratio as determined by the notched disk 18. By parallel shifting of the guide rail 28, which is effected in the embodiment of FIG. 1 by moving the rail in the elongated holes 31, the trajectory of the objective 7 can be adjusted relative to the zero line 33. In this manner, an adjustment of the graduation distances on the graduation scale support is provided. The carrier bolt 26, directly displaced by the adjustment mechanism 16, in combination with its movable seating in the longitudinal direction of the lever 8 and the adjustable guide rail 28 forms a kind of transmission gear whose transmission ratio can be determined by the position of the guide rail 28.

Figure 4:
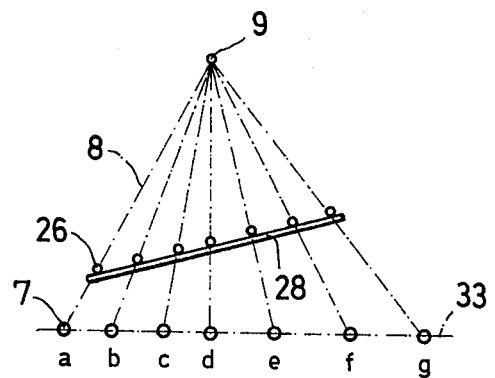
FIG. 4 is a view similar to FIG. 2 with an inclined guide rail.

FIG. 4 illustrates in a similar schematic fashion as in FIGS. 2 and 3 with like reference numerals relating to like parts yet another embodiment of the adjustment arrangement comprising an inclined guide rail 28. The trajectory of the carrier bolt 26 runs at an angle to the zero line 33. Thus, not only the resulting trajectory of the objective 7 is changed, but also the ratios of movement increments between the various indexing stop positions. If the carrier bolt 26 is moved with equal spacing increments along the guide rail 28 the distances between indexing points a through g of the objective 7 will become increasingly larger if the guide rail is at an angle as shown in FIG. 4. Thus, an even graduation of the graduation scale support with progressively increasing graduation distances can be compensated for, for example.

Figure 5:
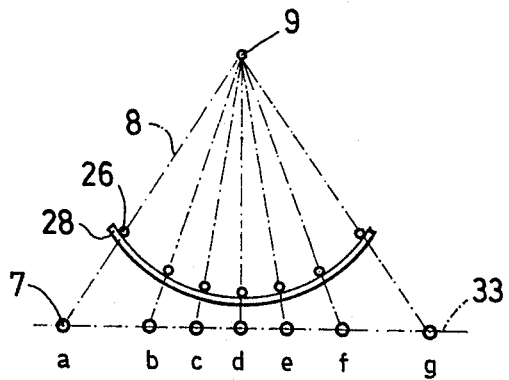
FIG. 5 is a view similar to FIG. 2 with a circularly bent guide rail.

FIG. 5 shows an embodiment provided with a curved guide rail 28, which in the shown arrangement allows for a correction of graduation distances which change symmetrically relative to a center position. Other shapes of the guide rail 28 can be used so that its configuration, its inclination in relation to the zero line 33 and its distance relative to the pivot point 9 allow for any adjustment of the trajectory of the objective 7 which is moved along the zero line 33 of the unloaded graduation scale support 1 to any random irregularities in the graduation scale distances. Deviations from an even course by the adjustment mechanism 15 can be corrected in this manner also.

It is important that the movement of the adjustment mechanism 16 be transmitted, in transmission type action, to the movement of the objective 7 and that the transmission ratio be controllable. If the guide rail 28 runs parallel to the zero line 33, the transmission ratio is changed evenly over the total motion trajectory. If the guide rail 28 is not parallel to the zero line, however, the transmission ratio varies from point to point. It is especially this point-by-point change of transmission ratios which makes an optimum adjustment of the trajectory of the objective possible.

The motion of the carrier bolt 26 has been explained in relation to a normally operated indexing drum. It will be apparent that a number of other possibilities exist for displacing the carrier bolt, for example, by a motor driven pulley, by a treaded spindle with an adjustment motor, etc. Also, it is not necessary that the lever 8 be developed telescopically and controlled by the guide rail 15. The zero line of the unloaded graduation scale support can also be designed as a circle around the pivot point 9. In this case the lever 8 would be made rigid. Since, at a constant transmission ratio, guide rail and zero line must run parallel along the entire course of shifting, the guide rail in this case should be circular and concentrically arranged, similar to the guide rail of FIG. 5.

It is a further advantage of this invention to provide an adjustment of the trajectory of the objective 7, to compensate for errors, by correct positioning of the guide rail 28. Therefore, the attachment of the guide rail 28 to the scale housing by means of the screws 29 and the elongated holes 31 is only an example of such adjustment arrangement. Other adjustment forms of mounting such as eccentric disks, can also be used.

Having thus described the present invention by way of examples of practical embodiments thereof, what is claimed as new is as follows:

1. In a price indicating projection weighing scale for weighing merchandise and comprising a housing, a plurality of price scales each relating to a given base price mounted on a support member movable relative to said housing as a function of weight and an optical projection system with an objective movable and indexable relative to an appropriate price scale corresponding to a given base price for projection of a portion of the price graduation, the improvement comprising movable support means for said objective, control means for indexing said support means in accordance with the base price of the merchandise to be weighed, and transmission means between said control means and said support means, said transmission means having an adjustable transmission ratio.

2. The projection weighing scale of claim 1 wherein said movable support means comprises a swiveling lever adapted to swivel about a pivot point, a longitudinal slot in said lever, a pin slidably movable in said slot, and means dependent from said control means for displacing said pin along an adjustable guide rail.

3. The projection weighing scale of claim 2 wherein said slot is disposed in said lever in a radial direction.

4. The projection weighing scale of claim 3 wherein said guide rail is adjustable in distance from said pivot point.

5. The projection weighing scale of claim 2 wherein said guide rail is rectilinear.

6. The projection weighing scale of claim 5 wherein said guide rail is adjustable in distance from said pivot point.

7. The projection weighing scale of claim 2 wherein said guide rail is non-rectilinear.

8. The projection weighing scale of claim 7 wherein said guide rail is adjustable in distance from said pivot point.

9. The projection weighing scale of claim 7 wherein said guide rail is curvilinear.

10. The projection weighing scale of claim 9 wherein said guide rail is adjustable in distance from said pivot point.

11. The projection weighing scale of claim 2 wherein said guide rail is adjustable in distance from said pivot point.

12. The projection weighing scale of claim 2 wherein said guide rail is adjustable relative to a zero line of said graduation scale support corresponding to said weighing scale being unloaded.

13. The projection weighing scale of claim 2 wherein said guide rail is adjustably attached to the housing of said weighing scale by way of elongated mounting holes.

14. The projection weighing scale of claim 2 wherein said control means comprises a rotatable drum, peripheral notches disposed about the periphery of said drum for indexing of said drum in an angular position, a cable for winding on said drum and unwinding therefrom, said cable being attached to said pin.

15. The projection weighing scale of claim 2 wherein said lever comprises a first portion connected to said pivot point and a second portion telescopic relative to said first portion, said second portion supporting said objective being guided by a guide rail.

* * * * *